United States Patent [19]

Copp

[11] Patent Number: 4,623,050
[45] Date of Patent: Nov. 18, 1986

[54] SHOE HOLD-DOWN PIN AND SPRING CLIP

[75] Inventor: Douglas M. Copp, West Milton, Ohio

[73] Assignee: General Motors Corporation, Detroit, Mich.

[21] Appl. No.: 771,839

[22] Filed: Sep. 3, 1985

[51] Int. Cl.⁴ ............................................. F16D 51/00
[52] U.S. Cl. ................................ 188/340; 188/250 F; 403/155; 411/522
[58] Field of Search ............. 188/340, 250 A, 250 G, 188/250 F, 382, 234, 78, 325, 335; 24/573; 411/516–530, 347, 352, 353, 341–343; 403/155

[56] References Cited

U.S. PATENT DOCUMENTS

| 2,295,685 | 9/1942 | Place | 411/524 |
| 2,999,566 | 9/1961 | Naudzius | 188/340 |
| 3,152,664 | 10/1964 | Swift | 188/340 |
| 3,186,519 | 6/1965 | Johannesen | 188/340 |

FOREIGN PATENT DOCUMENTS

| 1109268 | 7/1954 | France | 188/340 |
| 899061 | 6/1962 | United Kingdom | 188/340 |
| 2000561 | 1/1979 | United Kingdom | 188/340 |

Primary Examiner—Douglas C. Butler
Attorney, Agent, or Firm—D. D. McGraw

[57] ABSTRACT

A one piece spring clip is positioned on a headed brake shoe hold-down pin so that the spring clip is compressed with a camming action until the clip reaches an over-center condition. Further installing movement of the spring clip permits the spring to expand and lock itself in the installed position. The spring has a primary spring section absorbing normal compression loads and secondary spring sections resisting excessive compression loads.

3 Claims, 4 Drawing Figures

SHOE HOLD-DOWN PIN AND SPRING CLIP

The invention relates to a drum brake having a hold-down pin for holding the brake shoe in position on the backing plate, and a spring clip holding the shoe and the pin together on the backing plate. The spring clip is a reversely bent clip with spring forked ends arranged so that both spring ends are positioned about the headed hold-down pin. The spring is pushed into position by an arcuate movement so that it is compressed with a camming action until the clip reaches an over-center position. The spring then begins to expand and locks itself in position, engaging one side of the brake shoe web and the underside of the pin head. The spring clip is easily installed with a thumb, taking advantage of the over-center action.

The spring body between the spring ends is generally U-shaped and is spring compressed by the camming action. When it is moved part way toward the installed position, the spring body begins to decompress and the clip locks itself into position.

There is a raised portion on the bottom end of the clip that is the part engaging the shoe web about the body of the hold-down pin. A similar depressed portion is provided at the other end of clip so that the depressed portions face each other in raised relation about either side of the hold-down pin. During high compression of the spring, the primary spring action afforded by the U-shaped structure of the spring body may collapse to the extent that it bottoms out and the oppositely disposed raised portions engage. These raised portions act as secondary springs to absorb the excess load.

IN THE DRAWING

Figure 1:
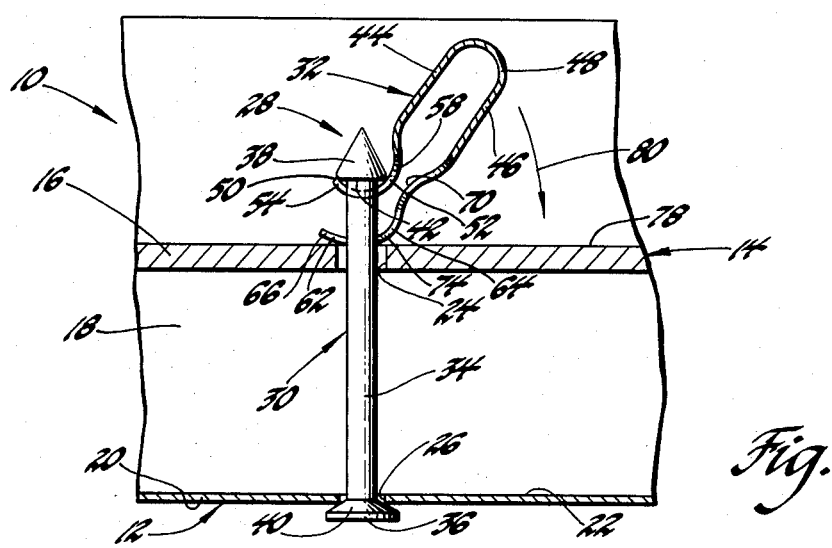
FIG. 1 is a fragmentary cross-section view of a portion of a drum brake and illustrating the hold-down pin and spring clip embodying the invention, the spring clip having been placed in position and about to be installed in its final position.

The drum brake 10 has pertinent portions thereof illustrated in the drawing. In particular, the backing plate 12 is shown, and the brake shoe assembly 14 is illustrated as being mounted on the backing plate 12. Shoe assembly 14 includes a shoe web 16 and a shoe rim 18, constructed in the usual manner. The edge 20 of shoe rim 18 is illustrated as being in engagement with the side 22 of the backing plate 12. Shoe web 16 is provided with an opening 24 which is generally axially aligned with a similar opening 26 in backing plate 12. The hold-down pin and spring assembly 28 embodying the invention is provided to resiliently mount the shoe assembly 14 on the backing plate so that the shoe may move as the brake is actuated and released, in a manner well known in the art. The assembly 28 also resiliently secures the shoe assembly 14 laterally so that it may move away from the backing plate 12 when forces to cause such movement are exerted thereon, without adversely affecting the shoe hold-down and mounting arrangement.

Assembly 28 includes the hold-down pin 30 and the spring clip 32. Pin 30 has a shaft 34 with a head 36 on one end and another head 38 on the other end. Pin head 36 has a conical shape on its underside 40 so that when the pin is inserted through openings 26 and 24, the head underside will engage the edge of opening 26 and will permit the pin to pivot in that opening. The pin head 38 is preferably conically shaped and has a flat underside 42 so that the head 38 is somewhat larger in diameter than shaft 34. The conical shape of head 38 makes it somewhat easier to insert pin 30 through openings 26 and 24 during the assembly operation. When head 36 is in engagement with the edge of opening 26, and the shoe rim edge 20 is in engagement with backing plate 12, head 38 extends through and beyond the opening 24 of shoe web 16.

Figure 2:
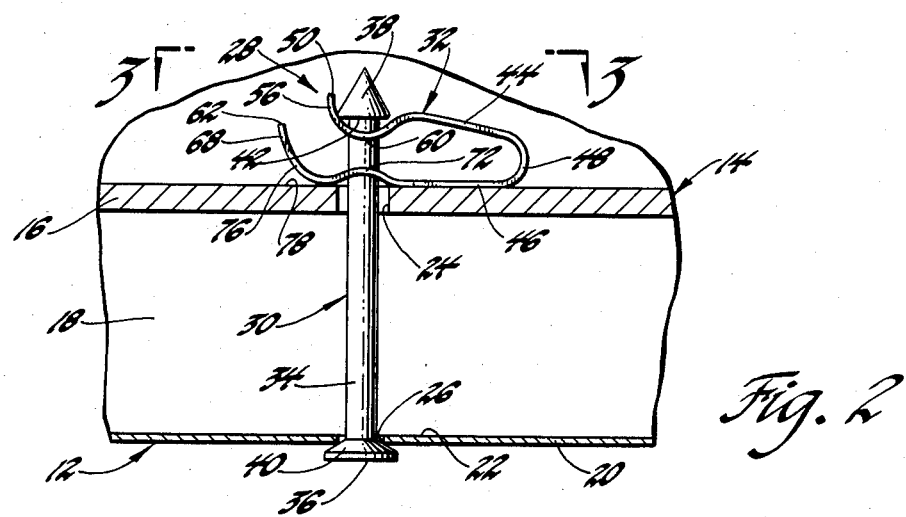
FIG. 2 is similiar to FIG. 1 but shows the spring clip in elevation and in the fully installed position.
Figure 3:
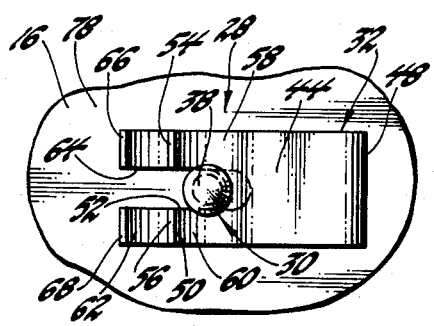
FIG. 3 is a fragmentary elevation view of the spring clip and pin taken in the direction of arrows 3—3 of FIG. 2.
Figure 4:
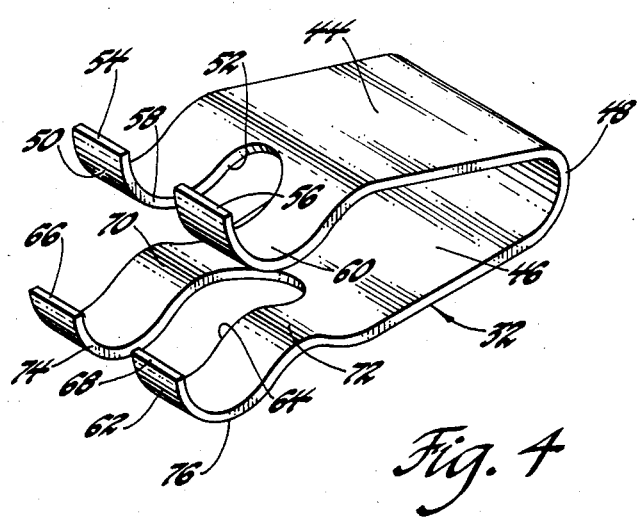
FIG. 4 is a perspective view of the spring clip embodying the invention.

Spring clip 32 is a generally U-shaped spring defined by a top section 44 and a bottom section 46 joined by the primary spring section 48. The free end 50 of spring clip top section 44 is bifurcated by a slot 52 to define a pair of fork-like fingers 54 and 56. These fingers are arcuately curved first toward and then away from the clip bottom section 46 as illustrated at 58 and 60. These curved finger portions form secondary spring sections of the top section 44. The free end 62 of bottom section 46 is somewhat similarly formed with a slot 64 defining a pair of fork-like feet 66 and 68. Feet 66 and 68 are generally S-shaped in longitudinal cross-section so as to be arcuately curved first toward the fingers 54 and 56 and then away from those fingers to form secondary spring sections 70 and 72 of the clip bottom section 46. Feet 66 and 68 are then recurved back toward fingers 54 and 56 to form cam-like foot portions 74 and 76. As can be seen in FIG. 2, the arched secondary spring sections 58 and 60 of top section 44 and the arched secondary spring sections 70 and 72 of the bottom section 46 extend toward each other and are in engageable relation with each other so as to be engaged when the primary spring section 48 is sufficiently compressed.

The spring clip 32 is installed by positioning the fingers 54 and 56 and the feet 66 and 68 on either side of the pin shaft 34, with the upper surface of fingers 54 and 56 being positioned under and engaging the bottom of pin head 38. The feet 66 and 68 are also positioned so that the pin shaft 34 is between them and they engage the side surface 78 of the shoe web 16 on either side of the web opening 24, as seen in FIG. 1. The main body of the spring clip 32 formed by the top section 44 and the bottom section 46 and joined by the primary spring section 48 is tilted upwardly as seen in FIG. 1 relative to the web surface 78.

The spring clip is then pushed downwardly in the direction of arrow 80. This may be easily done by the thumb of the installer. As the spring clip is moved to receive the pin shaft 34 further inwardly of the bottom slot 64, with the fingers 54 and 56 pivoting slightly about the bottom portion of pin head 38, the primary spring section 48 is compressed, bringing the top section 44 and the bottom section 46 angularly more closely together. Further movement of the spring clip 32 in the direction of arrow 80 causes the primary spring section 48 to pass over center, thereafter permitting partial expansion of the primary spring section 48 as the clip is moved to the final installation position shown in FIG. 2, to retain the spring clip on the pin and the shoe web. Thus the secondary spring sections of the fingers and the feet respectively engage the pin head 38 and the shoe web 16.

The shoe assembly 14 is therefore resiliently held in position on the backing plate 12, the assembly 28 permitting sliding movements of the shoe assembly 14 relative to the backing plate and also some movements toward and away from the backing plate by compression of the primary spring section 48. If for any reason there is an excess compression load exerted on the spring clip because the shoe assembly is moved further away from the backing plate 12 in the direction of pin head 38, the secondary spring sections 58 and 60 will engage the secondary spring sections 70 and 72 of the fingers 54 and 56 and the feet 66 and 68, respectively, so that the secondary spring sections cooperate to resist the excess compression load exerted on the spring clip by spring action.

The embodiments of the invention in which an exclusive property or privilege is claimed are defined as follows:

1. In a drum brake having a backing plate and a brake shoe assembly, the brake shoe assembly having a shoe web, and hold-down mechanism for holding the brake shoe assembly on the backing plate while accommodating brake actuation and release movements of the brake shoe assembly relative to the backing plate, the hold-down mechanism comprising:

a hold-down pin having a pin shaft extending through an opening in the backing plate and a corresponding opening in the shoe web, said pin having a first head on one pin end locating said pin axially relative to the backing plate and a second head on the other pin end positioned beyond the shoe web opening;

and a removable over-center spring clip resiliently securing said pin to said backing plate and said shoe web, said spring clip comprising:

a reversely bent leaf spring forming a top section and a bottom section and a primary spring section joining said top and bottom sections at the reverse bend;

said top section having a slot formed therein at the spring end opposite said primary spring section to define a pair of fork-like fingers, said fingers being arcuately curved first toward and then away from said bottom section to define first depression means receiving said pin second head therein with said pin shaft extending through said slot;

said bottom section having a slot formed therein at the spring end opposite said primary spring section to define a pair of fork-like feet, said feet being generally S-shaped in longitudinal cross section so as to be arcuately curved first toward said fingers and then away from said fingers to form secondary spring sections defining second depression means through which said pin shaft extends, and then being recurved back toward said fingers to form cam-like foot portions defining over-center spring section means;

said fingers engaging said pin second head to exert spring force thereon from said primary spring section;

said feet receiving said pin shaft therebetween and engaging the shoe web, with initial shoe web engagement during installation of said spring clip having said cam-like foot portions engaging the shoe web and, as said spring clip is moved to receive said pin shaft further inwardly of said bottom section slot, acting to compress said primary spring section and then passing over center to permit partial expansion of said primary spring section to retain said spring clip on said pin and the shoe web, and, upon continued installation movement of said spring clip to engage the shoe web on each side of the shoe web opening through which the pin shaft extends, such engagement being by the secondary spring sections;

the portions of said spring clip fingers defining said first depression means engaging the portions of said spring clip feet secondary spring sections defining said second depression means upon full compression of said primary spring section with any excess compression load exerted on said spring clip then being resisted by spring action of said secondary spring sections, said over-center spring section means always being spaced further apart than said first and second depression means portions spaced apart are so that any such excess compression load exerted on said spring clip is exerted in a plane passing through said first and second depressions means and said pin shaft transversely of said spring fingers and feet.

2. For use in a drum brake having a backing plate, a brake shoe assembly including a shoe web, a hold-down mechanism for holding the brake shoe assembly on the backing plate while accommodating brake actuation and release movements of the brake shoe assembly relative to the backing plate, the hold-down mechanism including a hold-down pin having a pin shaft extending through an opening in the backing plate and a corresponding opening in the shoe web, the pin having a first head on one pin end locating the pin axially relative to the backing plate and a second head on the other pin end positioned beyond the shoe web opening, and a hold-down spring resiliently securing the pin to said backing plate and the shoe web;

the invention residing in a hold-down spring formed as a removable over-center spring clip and comprising:

a reversely bent leaf spring forming a top section and a bottom section and a primary spring section joining said top and bottom sections at the reverse bend;

said top section having a first slot formed therein at the spring end opposite said primary spring section to define a pair of fork-like fingers, said fingers being arcuately curved first toward and then away from said bottom section to define first outwardly facing depression means receiving the pin second head therein with the pin shaft extending through said first slot;

said bottom section having a slot formed therein at the spring end opposite said primary spring section to define a pair of fork-like feet, said feet being generally S-shaped in longitudinal cross section so as to be arcuately curved first toward said fingers and then away from said fingers to form secondary spring sections defining second outwardly facing depression means through which the pin shaft extends in said second slot, and then being recurved back toward said fingers to form cam-like foot portions defining over-center spring section means;

said fingers engaging the pin second head to exert spring force thereon from said primary spring section;

said feet receiving the pin shaft therebetween and engaging the shoe web, with initial shoe web engagement during installation of said spring clip having said cam-like foot portions engaging the shoe web and, as said spring clip is moved to receive the pin shaft further inwardly of said bottom section slot, acting to compress said primary spring section and then passing over center to permit partial expansion of said primary spring section to retain said spring clip on the pin and the shoe web, and, upon continued installation movement of said spring clip to engage the shoe web on each side of the shoe web opening through which the pin shaft extends, such engagement being by the secondary spring sections;

the portions of said spring clip fingers defining said first outwardly facing depression means being adapted to engage the portions of said spring clip feet secondary spring sections defining said second outwardly facing depression means upon full compression of said primary spring section with any excess compression load exerted on said spring clip then being resisted by spring action of said secondary spring sections, said over-center spring section means always being spaced further apart than the portions defining said first and second outwardly facing depression means are spaced apart so that any such excess compression load exerted on said spring clip is transmitted through said depression means-defining portions between the pin second head and the shoe web.

3. A reversely bent leaf spring having a top section and a bottom section joined by a primary spring section and first and second spring free ends respectively on said top and bottom sections, said first spring free end having abutment means thereon extending toward said second spring free end and normally spaced therefrom, said second spring free end being generally S-shaped in longitudinal cross section so as to be arcuately curved first toward said abutment means and then away from said abutment means to form secondary spring section means in normally spaced apart but engageable alignment with said abutment means, and then being recurved back toward said first spring free end to form cam-like means spaced further apart from said first spring free end than said abutment means are spaced from said secondary spring section means;

said first spring free end being adapted to engage a first spring biased member, and said second spring free end on either side of said secondary spring section means being adapted to engage a second spring biased member, so that said primary spring section then exerts spring force on both of the members tending to move the members apart;

said abutment means, upon sufficient force being exerted to move the spring biased members closer together, engaging said secondary spring section means and transmitting force thereto with said secondary spring section means resiliently resisting that force tending to move the spring biased members still closer together.

* * * * *